July 2, 1946.  T. H. BREEN  2,403,044
FURNACE DEVICE
Filed March 22, 1945  2 Sheets-Sheet 1

INVENTOR
THOMAS H. BREEN
BY
Bean, Brooks, Buckley & Bean.  ATTORNEYS

July 2, 1946.　　　T. H. BREEN　　　2,403,044
FURNACE DEVICE
Filed March 22, 1945　　　2 Sheets-Sheet 2

INVENTOR
THOMAS H. BREEN
BY
Bean, Brooks, Buckley & Bean.　ATTORNEYS

Patented July 2, 1946

2,403,044

UNITED STATES PATENT OFFICE 2,403,044

FURNACE DEVICE

Thomas H. Breen, Buffalo, N. Y., assignor of one-half to Charles A. Kennedy, Buffalo, N. Y.

Application March 22, 1945, Serial No. 584,065

11 Claims. (Cl. 126—148)

This invention relates to a device for use in furnaces fired by the use of solid fuel.

The principles of the present invention may have wider application, but they are conveniently set forth and illustrated with reference to solid fuel furnaces of the kind commonly employed in domestic warm air space heating. In such furnaces the fire pot and combustion chamber are generally surrounded by a casing which is spaced outwardly therefrom to permit passage of air to be heated upwardly about the fire pot and combustion chamber. In the commonest form of such furnaces a number of parallel bars provide a suitable grate and in the form referred to here by way of example, the grate is of the well-known type wherein four triangular bars are arranged in parallel fashion. The two adjacent bars at one side of the grate are geared together to be jointly rotated or oscillated in shaking and the two bars at the other side are likewise so connected. Because of the triangular cross-section of these conventional grate bars and the triangular flanges which are formed along them, the bars may be disposed with any of their three surfaces facing upwardly, to co-operate with each other in forming a relatively flat surface for supporting a fuel bed.

The object of the present invention is to introduce a central body element resting upon and rising substantially above the grate; so that, in place of the conventional solid more or less cylindrical bed of fuel, there is provided an annular fuel bed extending about the element. In this way the average proximity of the burning fuel is much closer to the wall of the fire pot and therefore combustion is much more localized adjacent the walls of the fire pot and combustion chamber.

In conventional furnaces of this kind combustion tends to be concentrated at the center of the fuel bed, which is most remote from the walls, and the burning of fuel close to the walls is slower and relatively inefficient. In fact the more or less dormant fuel or ashes adjoining the walls under certain fire conditions acts as an insulator between the more active central fire and the fire pot wall. By pursuing the principles of the present invention, the tendency of draft air to channel through the center of the fuel bed is obviated and uniform and efficient combustion takes place entirely about the interposed element and in particular closely adjacent to the walls of the fire pot and combustion chamber.

The central element thus introduced is preferably of refractory material, in the illustrated form a solid two-piece body. It may be cast fire clay, but the manner in which it is made and the material used is not important save that it be refractory enough to withstand the degree of heat to which it is subjected. A further advantage of the use of a highly refractory material is due to its relatively high specific heat and low heat conductivity. The heat absorbed during hot fire periods is high in quantity and is given off at a relatively slow rate during cooler periods whereby it tends to make the furnace output more nearly uniform at all times.

In providing the present device, it is essential that means be provided to insure that the auxiliary member remain permanently in its desired central and erect position on the grate. Special means are provided so that the grate bars may be freely oscillated within limits necessary for shaking or dumping the fire without in any way permitting displacement of the auxiliary device and particularly without permitting any deviation from the desired position in which its axis extends vertically.

Various modifications of the construction shown in the accompanying drawings and described in the following specification will occur to those skilled in the furnace art. It is to be understood, however, that the present disclosure is merely by way of example and that various changes and modifications may be made without departing from the spirit of the invention, which is not limited excepting as defined in the appended claims.

Figure 1:
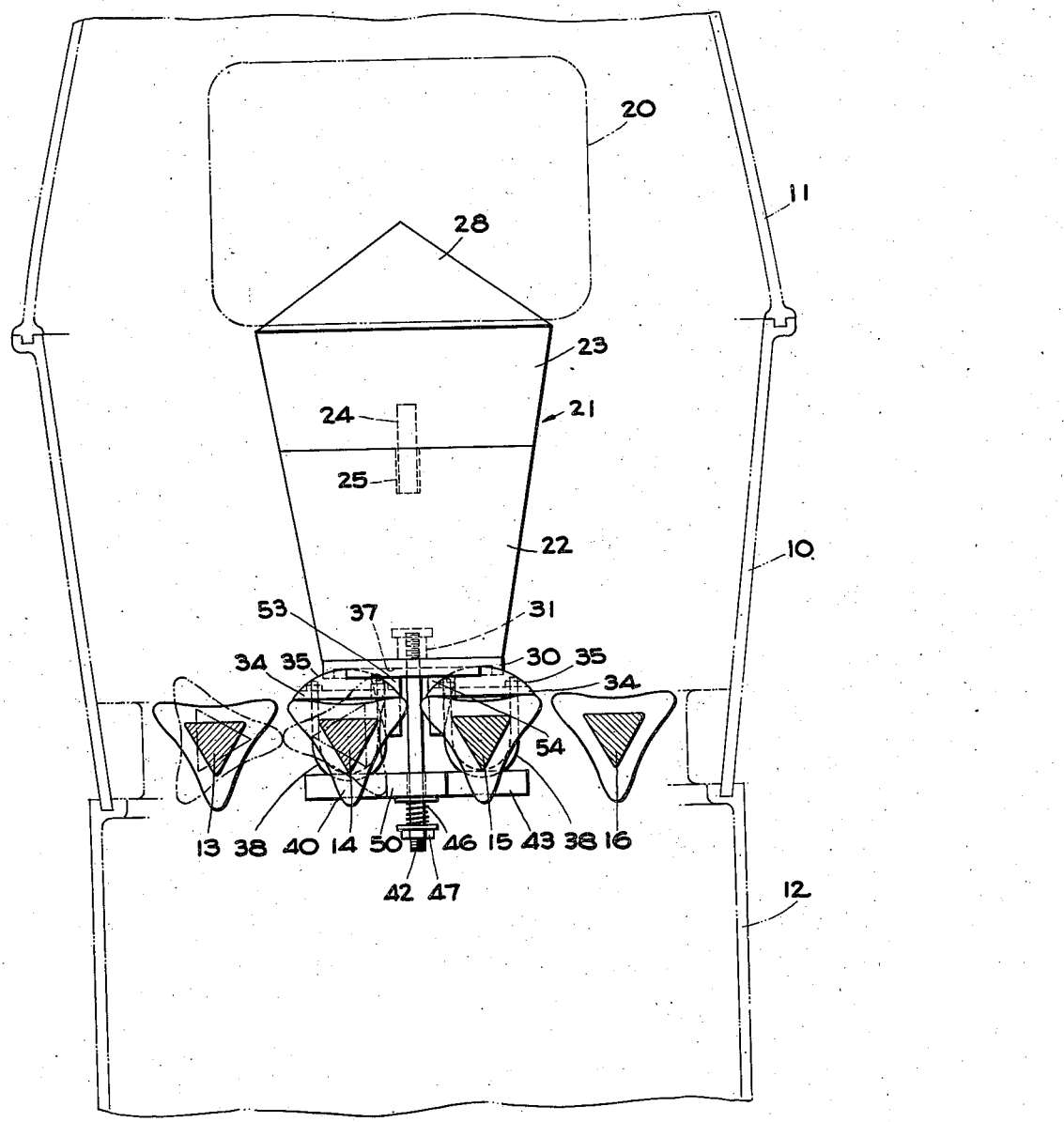
Fig. 1 is a fragmentary cross-sectional elevational view of a conventional furnace fire pot and combustion chamber having the triangular bar type of grate and provided with one form of the device of the present invention.

Throughout the several figures of the drawings like characters of reference denote like parts. In Fig. 1 the numeral 10 indicates a furnace fire pot in dot and dash lines with a conventional combustion chamber 11 mounted thereon, the whole being supported upon the usual ash pit housing 12. In the furnace being referred to by way of example four conventional triangular grate bars numbered 13 through 16 are supported in the base of the fire pot in an entirely conventional manner, and the details of their mounting is accordingly not illustrated.

For convenience of introducing the present device through the usual furnace fire door 20 the central device is preferably made in several sections. The device is designated generally 21 in Fig. 1 and comprises a lower section 22 and an upper concentric section 23 which rests on the lower section. In a preferred form the upper section has a locating pin 24 embedded therein which projects downwardly and is received in a recess 25 formed in the upper surface of the lower section 22. The assembled elements 22 and 23 provide an upwardly flaring frusto-conical body having a conical peak or top 28.

The lower end of section 22 of element 21 is preferably secured to a discoidal base or mounting plate 30 of iron or steel when the device is assembled in a furnace. In the illustrated instance the section 22 has embedded therein, during casting, a flanged internally threaded bushing 31. The lower section 22 is held in place upon plate 30 when the device is in assembled position in a manner which will presently appear. The bushing 31 is permanently associated with section 22, the embedded flange thereof securing the bushing and section 22 against separation.

Figure 2:
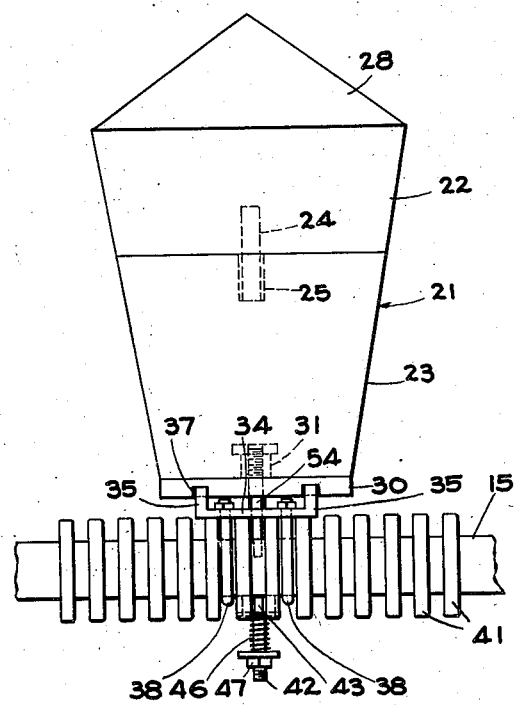
Fig. 2 is a fragmentary elevational view of the central grate bars of Fig. 1, viewed at right angles thereto and with the central device of Fig. 1 in position thereon.
Figure 3:
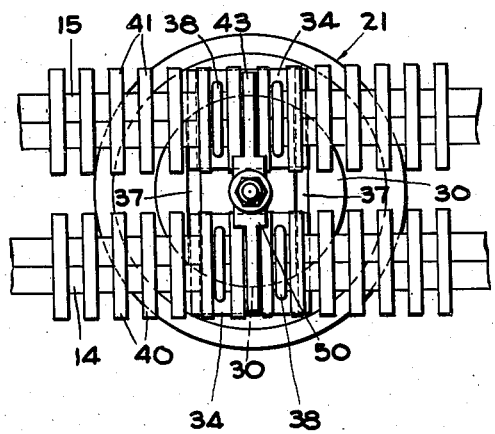
Fig. 3 is a bottom plan view of the structure shown in Fig. 2.

Each of the two central grate bars 14 and 15 is provided with a plate 34 having opposite marginal upwardly extending flanges 35 whose upper edges are arcuately curved. The arcs defining the upper edges of flanges 35 are struck from the center of oscillation of the grate bars with which they are associated and the flanges project into parallel grooves 37 formed in the under side of plate 30. The pair of plates 34 are rigidly secured to the grate bars 14 and 15 by means of U-bolts 38, a pair of which is provided for each of the plates. The bight portions of the U-bolts extend between the projecting flanges of the grate bars as best shown in Fig. 2. The triangular flanges of grate bar 14 are designated 40 and those of the grate bar 15 are designated 41.

While the arcuate flanges 35 of the plates 34 permit free oscillation of the grate bars, means are required for maintaining the element 22 in erect position during such oscillation. A stud 42 securely engaged in bushing 31 depends through a loose central opening in plate 30 and downwardly between the grate bars 14 and 15. A bar 43 has a central opening whereby it may be loosely placed over the depending part of the stud 42 and the outer ends of bar 43 are sufficiently narrow to pass freely between the triangular flanges 40 and 41 of the grate bars 14 and 15. The outer ends of bar 43 engage directly with the grate bars 14 and 15 at their under sides as shown in Figs. 1 and 2, and they are held in such engagement by a compression coil spring 46 which is retained by a nut 47 threaded to the lower end of stud 42.

By reason of the presence of spring 46, bar 43 continually rides against the under sides of the grate bars 14 and 15 during shaking oscillation of the grate bars despite the irregular cross sections of the latter. The element 22 is thus held at all times resiliently but firmly against the plate 30 and the latter is in turn held downwardly against the arcuate flanges 35. It is to be understood that equivalent relative formations of the under side of the central element and the grate-bar-carried elements may be employed. For instance, the grooves 37 might be arcuately concaved, in which case non-arcuate groove engaging portions of the grate bars could engage in them and operate as desired.

Obviously the arcuate flanges 35 extend through only one-third of a full circle and therefore oscillation of the grate bars must be limited to that degree. Full rotation of the grate bars, while conventionally posssible in grates of this type, is not essential, and the arrangement illustrated in the drawings by way of example permits oscillation of the grate bars to a full dumping position, which is all that is necessary. To prevent over-oscillation, the bar 43 has a central enlargement 50, and when the grate bars reach their desired limit of oscillation, their triangular flanges 40 and 41, as the case may be, strike the enlargement 50 to limit oscillation. In Fig. 1, the flanges 40 of grate bars 14 are shown in dot and dash lines in engagement with enlargement 50.

The under side of plate 30 has a pair of spaced depending lugs 53 and 54 which extend downwardly between the two central flanges 40 of bar 14 and the two central flanges 41 of bar 15, respectively, to assure accurate centering of plate 30.

What is claimed is:

1. Apparatus for use in a solid fuel fired furnace having a fire pot and a plurality of parallel oscillatable grate bars, said apparatus comprising a body element disposable centrally of the fire pot, body element supporting means fixed to the grate bars for oscillation therewith, said means and the lower portion of said body element having interengaging surfaces formed to permit oscillation of the grate bars without displacement of the body element, and means engaging between said body element and said grate bars for preventing upward movement of said body element from said supporting means.

2. Apparatus for use in a solid fuel fired furnace having a fire pot and a plurality of parallel oscillatable grate bars, said apparatus comprising a body element disposable centrally of the fire pot, body element supporting means fixed to the grate bars for oscillation therewith, said means and the lower portion of said body element having relatively intersliding surfaces formed to permit oscillation of the grate bars without displacement of the body element, one of said surfaces being arcuate and substantially concentric with the axis of oscillation of the associated grate bar, and means engaging between said body element and said grate bars for preventing upward movement of said body element from said supporting means.

3. Apparatus for use in a solid fuel fired furnace having a fire pot and a plurality of parallel oscillatable grate bars, said apparatus comprising a body element disposable centrally of the fire pot, body element supporting means fixed to the grate bars for oscillation therewith, said means and the lower portion of said body element having interengaging surfaces formed to permit oscillation of the grate bars without displacement of the body element, and means engaging between said body element and the under side of said grate bars for preventing upward movement of said body element from said supporting means.

4. Apparatus for use in a solid fuel fired furnace having a fire pot and a plurality of parallel oscillatable grate bars, said apparatus comprising a body element disposable centrally of the fire pot, body element supporting means fixed to the grate bars for oscillation therewith, said means and the lower portion of said body element having interengaging surfaces formed to permit oscillation of the grate bars without displacement of the body element, and means engaging resiliently between said body element and said grate bars for urging said body element downwardly against the supporting means.

5. Apparatus for use in a solid fuel fired furnace having a fire pot and a plurality of parallel oscillatable grate bars, said apparatus comprising a body element disposable centrally of the fire pot, body element supporting means fixed to the grate bars for oscillation therewith, said means and the lower portion of said body element having interengaging surfaces formed to permit oscillation of the grate bars without displacement of the body element, one of said surfaces being arcuate and substantially concentric with the axis of oscillation of the associated grate bar, and means engaging resiliently between said body element and said grate bars for urging said body element downwardly against the supporting means.

6. Apparatus for use in a solid fuel fired furnace having a fire pot and a plurality of grate elements movable to effect shaking, said apparatus comprising a body element disposable centrally of the fire pot, body element supporting means rigid with the grate elements for shaking movement therewith, said supporting means and the lower portion of the body element having interengaging surfaces formed to permit movement of the grate elements without displacement of the body element, and means engaging between said body element and said grate elements for preventing upward movement of said body element from said supporting means.

7. Apparatus for use in a solid fuel fired furnace having a fire pot and a plurality of parallel oscillatable grate bars, said apparatus comprising a body element disposable substantially centrally of the fire pot, means securable rigidly to the grate bars having arcuate upper surfaces substantially concentric with the axis of the grate bars, means at the under side of the central body element for supporting engagement against said arcuate surfaces, and means engaging between said central body element and said grate bars for preventing upward movement of said body element.

8. Apparatus for use in a solid fuel fired furnace having a fire pot and a plurality of parallel oscillatable grate bars, said apparatus comprising a body element disposable substantially centrally of the fire pot, means securable rigidly to the grate bars having arcuate upper surfaces substantially concentric with the axis of the grate bars, means at the under side of the central body element for supporting engagement against said arcuate surfaces, and means engaging between said central body element and the under side of said grate bars for preventing upward movement of said body element.

9. Apparatus for use in a solid fuel fired furnace having a fire pot and a plurality of parallel oscillatable grate bars, said apparatus comprising a body element disposable substantially centrally of the fire pot, means securable rigidly to the grate bars having arcuate upper surfaces substantially concentric with the axis of the grate bars, means at the under side of the central body element for supporting engagement against said arcuate surfaces, and means engaging resiliently between said central body element and said grate bars for urging said body element downwardly against the arcuate surfaces.

10. Apparatus for use in a solid fuel fired furnace having a fire pot and a plurality of parallel oscillatable grate bars, said apparatus comprising a body element disposable substantially centrally of the fire pot, means securable rigidly to each of a pair of the grate bars and having arcuate upper surfaces substantially concentric with the axis of the grate bars to which they are secured, means at the under side of the central body element for supporting engagement against said arcuate surfaces, and means engaging between said central body element and said grate bars for preventing upward movement of said body element.

11. Apparatus for use in a solid fuel fired furnace having a fire pot and a plurality of parallel oscillatable grate bars, said apparatus comprising a body element disposable substantially centrally of the fire pot, means securable rigidly to each of a pair of the grate bars having arcuate upper surfaces substantially concentric with the axis of the grate bars to which they are secured, means at the under side of the central body element for supporting engagement against said arcuate surfaces, and means engaging resiliently between said central body element and said grate bars for urging said body element downwardly against the arcuate supporting surfaces.

THOMAS H. BREEN.